United States Patent [19]
Rasmussen et al.

[11] Patent Number: 5,189,944
[45] Date of Patent: Mar. 2, 1993

[54] AUTOMATED FRENCH FRY COOKING APPARATUS

[75] Inventors: Glenn O. Rasmussen, Champlin; James W. Finkowski, Andover; Robert F. Meyer, Minneapolis; Richard L. Keller, Plymouth; Thomas P. Kempf, Brooklyn Park; Ronald N. Phillips, Moundsview, all of Minn.

[73] Assignee: Burger King Corporation, Miami, Fla.

[21] Appl. No.: 657,537

[22] Filed: Feb. 19, 1991

[51] Int. Cl.⁵ ............................................. A47J 37/12
[52] U.S. Cl. ........................................ 99/334; 99/357; 99/407; 99/409; 62/322; 222/56; 414/287; 414/299; 414/327; 414/419; 414/421
[58] Field of Search ............... 99/334, 352, 357, 404, 99/407, 409, 443 R, 443 C; 62/322; 193/17; 221/150 HC; 222/56; 414/287, 299, 327, 419, 421

[56] References Cited

U.S. PATENT DOCUMENTS

| | | | |
|---|---|---|---|
| 1,610,564 | 12/1926 | McLaughlin | 99/407 |
| 1,630,676 | 5/1927 | Smith | 99/404 |
| 1,889,663 | 11/1932 | Ilyus | 222/56 |
| 3,274,920 | 9/1966 | Benson | 99/407 |
| 3,357,341 | 12/1967 | Kocken et al. | 99/334 |
| 3,448,677 | 6/1969 | Dexters | 99/407 |
| 3,633,490 | 1/1972 | Schiffmann et al. | 99/443 C |
| 3,685,432 | 8/1972 | Hoebergs | 99/407 |
| 3,896,715 | 7/1975 | Mascret | 99/407 |
| 4,164,260 | 8/1979 | Blodgett | 177/1 |
| 4,489,647 | 12/1984 | Stamps et al. | 99/407 |
| 4,505,193 | 3/1985 | Mariotti | 99/330 |
| 4,722,267 | 2/1988 | Galockin et al. | 99/357 |
| 4,741,912 | 5/1988 | Katz et al. | 426/438 |
| 4,785,725 | 11/1988 | Tate et al. | 99/407 |
| 5,029,520 | 7/1991 | Okada | 99/407 |

FOREIGN PATENT DOCUMENTS

| | | | |
|---|---|---|---|
| 298900 | 1/1989 | European Pat. Off. | 99/352 |
| 2593308 | 7/1987 | France | 221/150 HC |
| 2088704 | 6/1982 | United Kingdom | 99/334 |

OTHER PUBLICATIONS

"Arch is Golden For Robot Company", Star Tribune, May 28, 1989, p. 8A.
"Autocafe" Takes Next Step in Vending, Food Business, Feb. 6, 1989, p. 17.

Primary Examiner—Timothy F. Simone
Assistant Examiner—Mark Spisich
Attorney, Agent, or Firm—Kinney & Lange

[57] ABSTRACT

A french fry cooking apparatus for deep-frying french fries includes a cooking unit having a plurality of frying baskets. Mounted above the cooking unit is a refrigeration unit which includes a first conveyor upon which a supply of frozen french fries is stored. The first conveyor discharges the fries onto a second conveyor which dispenses a metered quantity of fries to a delivery mechanism. The delivery mechanism includes a shaft and a rotatable directional chute for directing the frozen fries from the second conveyor into any one of the plurality of frying baskets. The frying baskets are pivotally attached to the cooking unit and are each movable by way of a drive unit between a loading/draining position for receiving fries from the chute and for draining oil from deep fried fries, a cooking position for deep frying the fries, and a dump position for discharging the deep fried fries from the frying basket. Deep fried fries are discharged onto a further conveyor which takes the fries to a holding bin. The fries are then distributed from the holding bin to customers as per their orders. Frozen french fries are loaded onto the first conveyor by way of a loading mechanism having a loading bin.

16 Claims, 11 Drawing Sheets

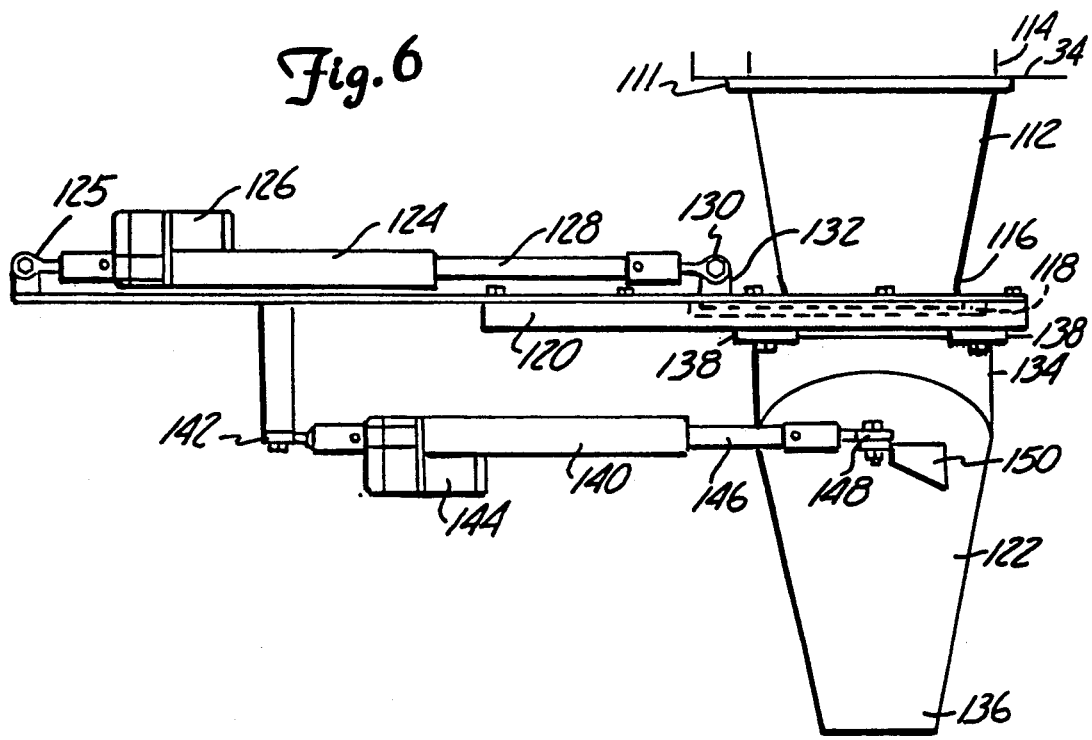
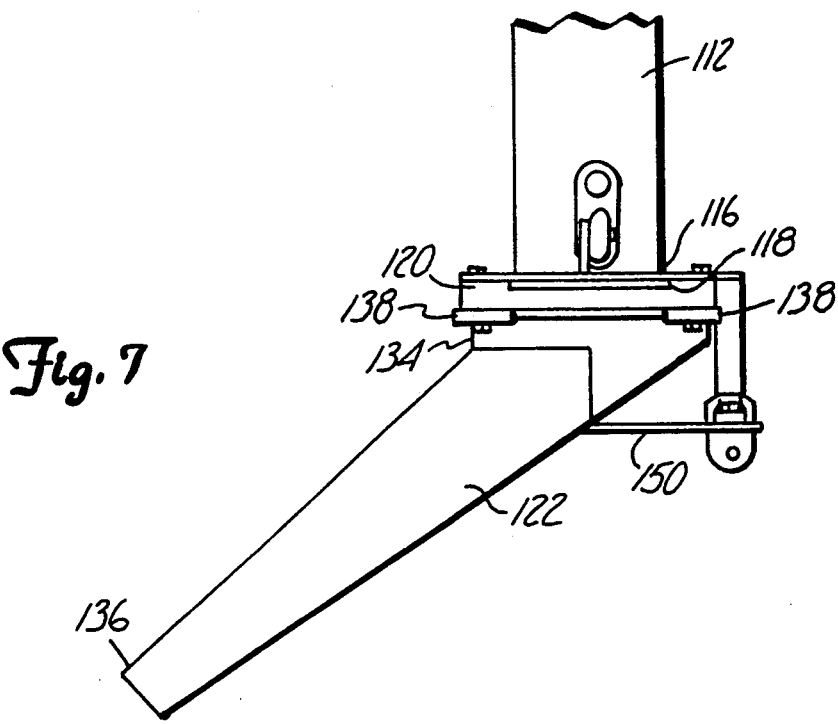

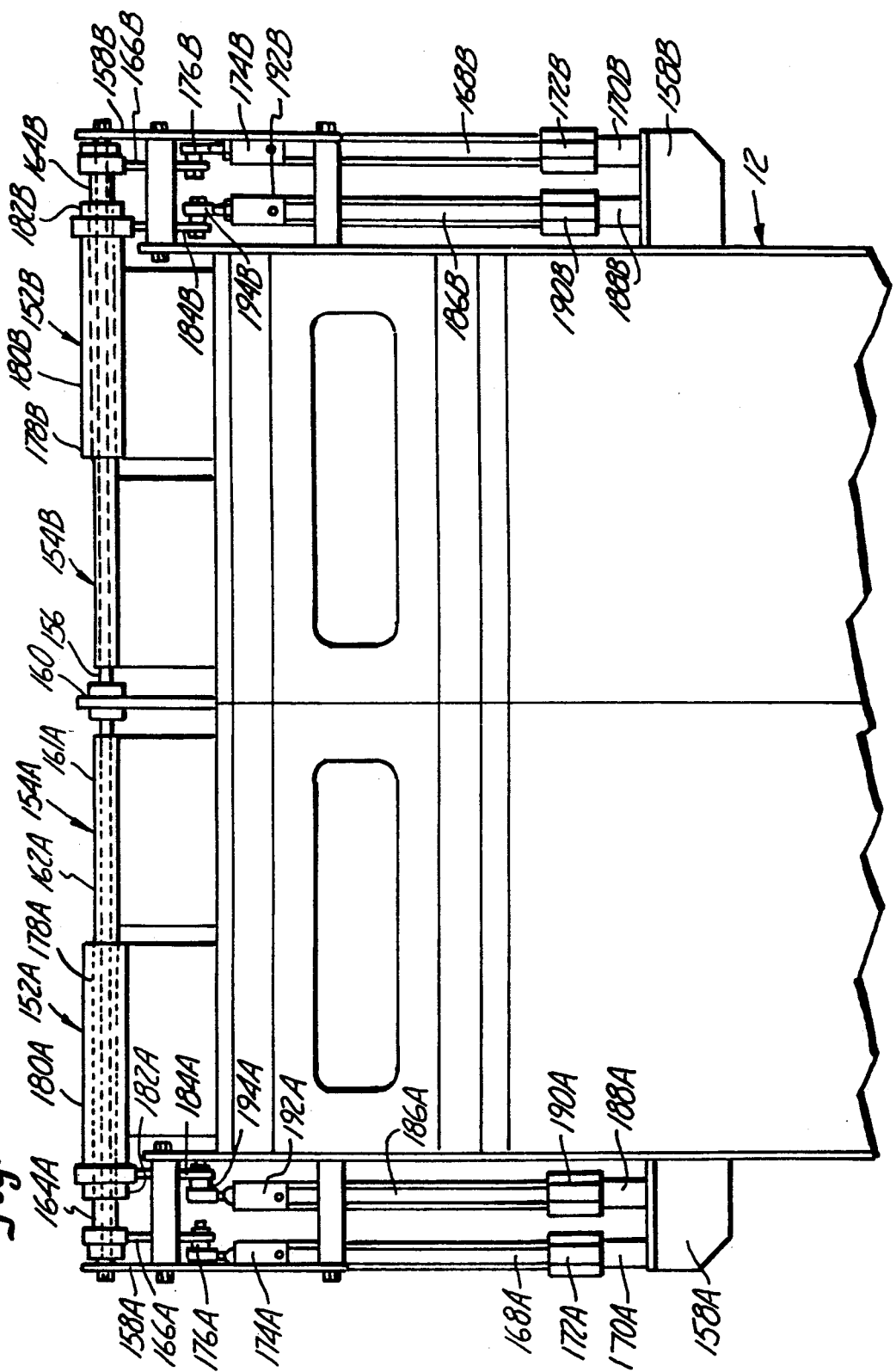

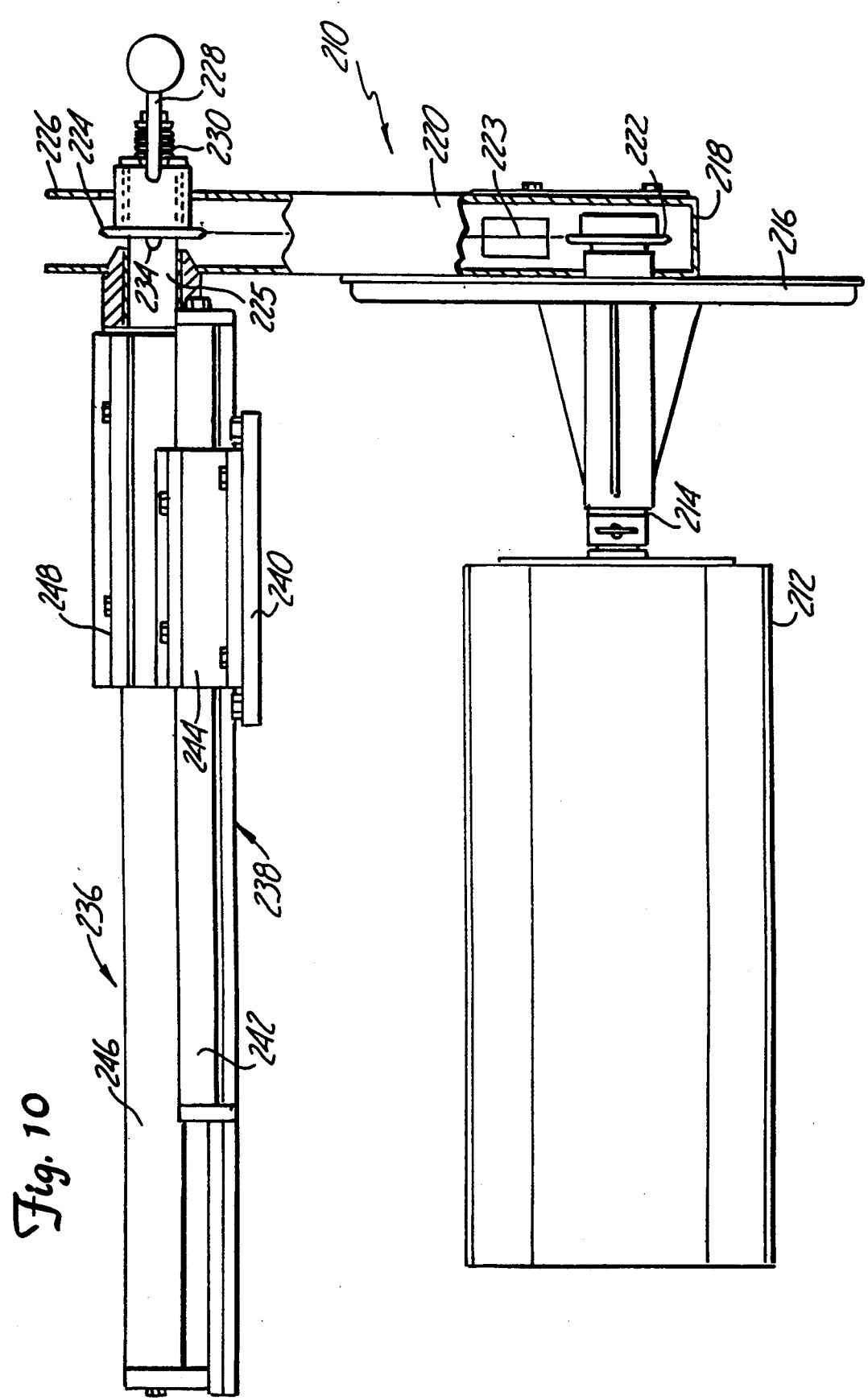

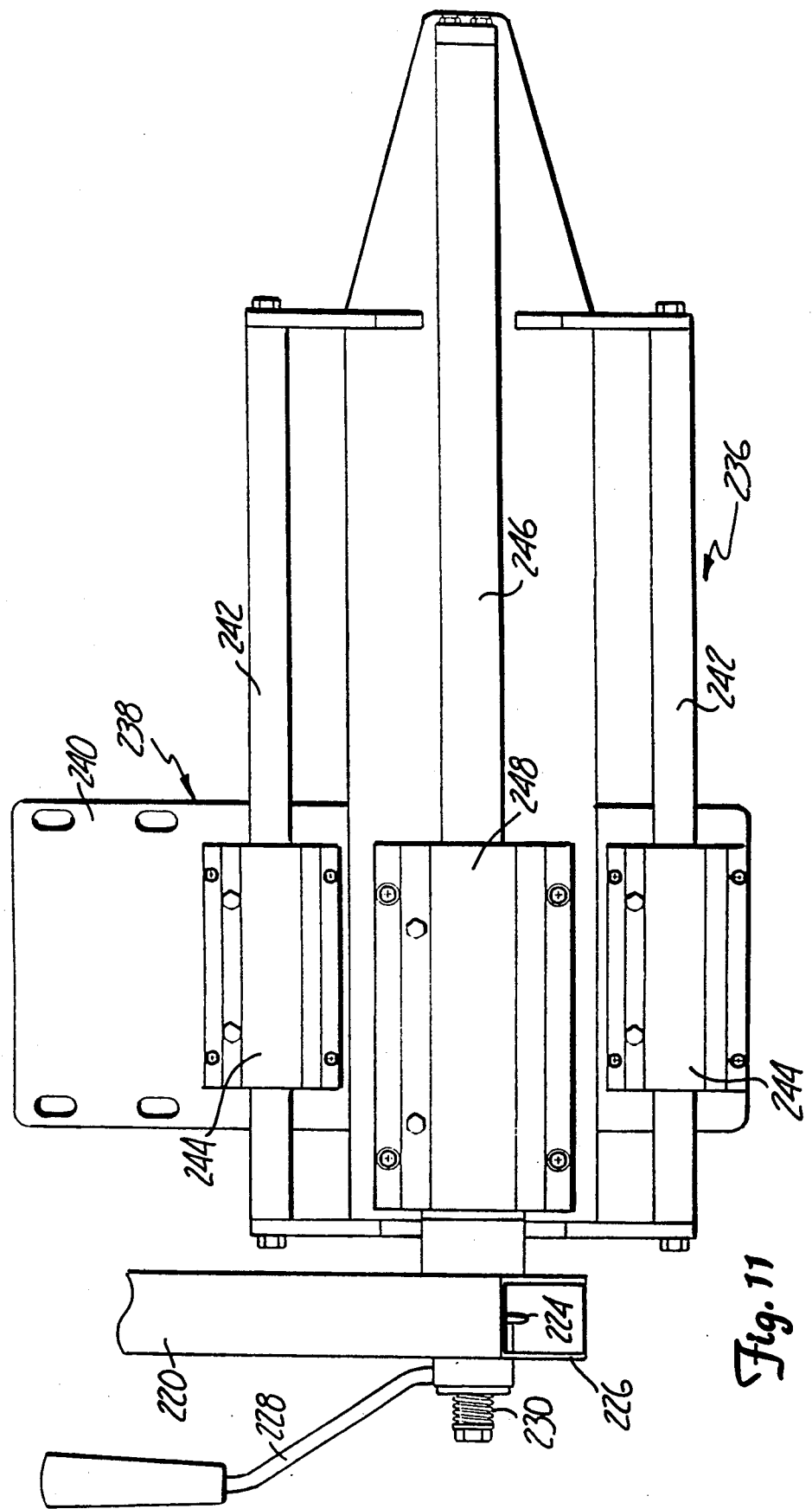

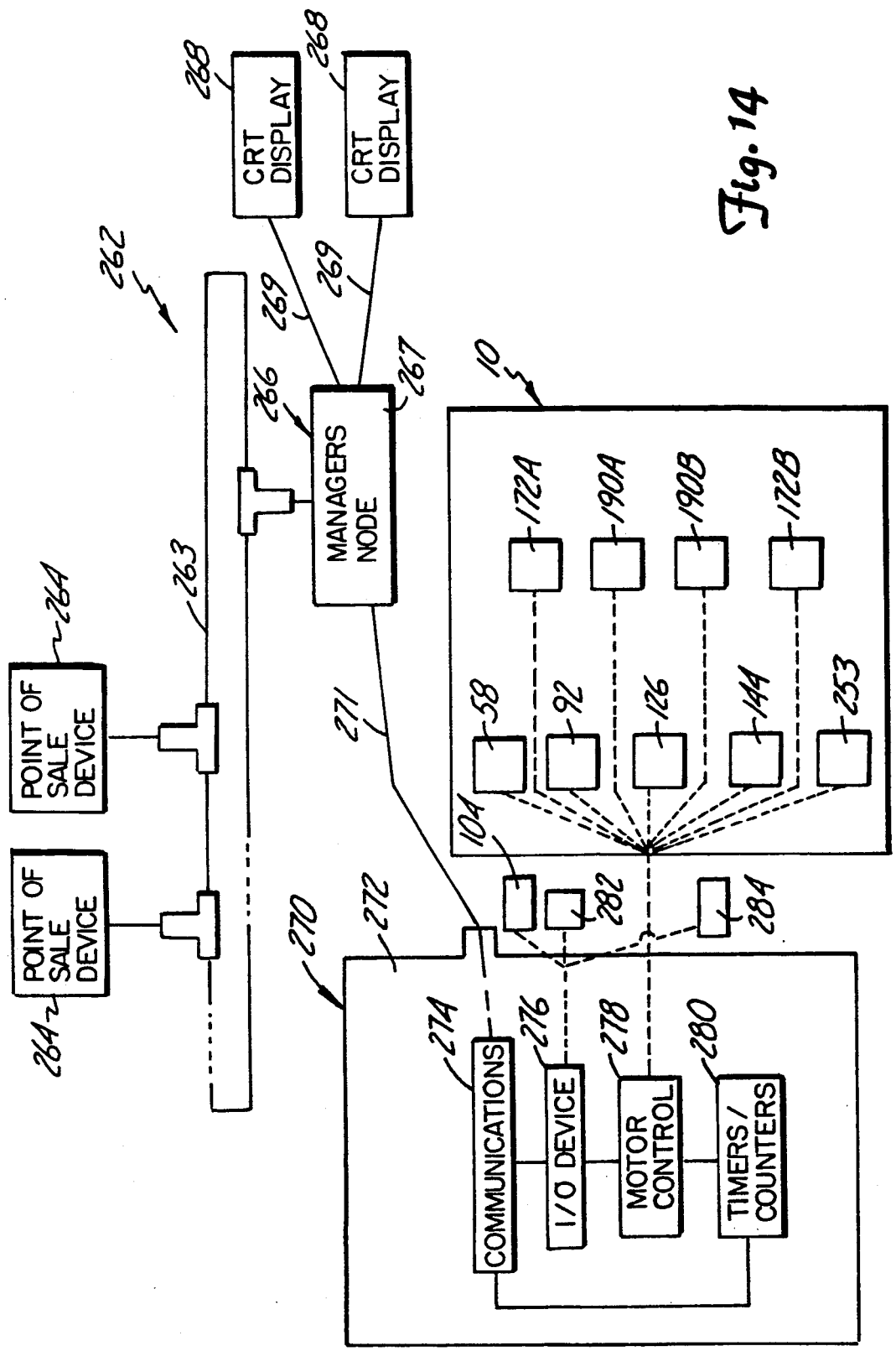

AUTOMATED FRENCH FRY COOKING APPARATUS

BACKGROUND OF THE INVENTION

The present invention relates to devices for deep frying foodstuff. In particular, the present invention is an automated french fry cooking apparatus for use in fast food establishments.

Typically, in fast food establishments, deep frying french fries is primarily a manual process. Prior to the deep frying process, sacks containing frozen french fries are removed from refrigerated storage and are allowed to stand at room temperature. The sacks of french fries are allowed to stand for generally two or more hours, until the french fries have thawed to a point where they can be deep fried. This process of allowing the french fries to thaw is referred to as "slacking".

Once the sacks of french fries have been slacked, an employee pours the french fries from the sacks into frying baskets. When cooked french fries are needed (as determined by orders of customers or as predicted by an employee), an employee immerses a required number of frying baskets of uncooked french fries into hot cooking oil contained within a deep frying apparatus. A timer is set and the french fries are deep fried in the cooking oil (which is at a temperature of approximately 300° F.) for a period of time (i.e., approximately two minutes and fifteen seconds).

When the timer goes off (indicating that the allotted cooking time is complete), an employee removes the frying baskets from the hot cooking oil and then pours the cooked french fries from the baskets into a holding bin. Once the cooked french fries are in the holding bin, an employee salts the fries and then scoops the french fries into fry bags. The bags of fries are then distributed to the customers as per their orders. Unsold cooked french fries remaining within the holding bin past seven minutes, from the time the fries were poured into the bin from the baskets, are disposed of because of a noticeable taste and quality difference between these fries and those just cooked.

As is apparent from the discussion above, the preparation of french fries is an extremely labor intensive procedure that can result in wide quality variations due to inconsistent slacking time, excessive hold times after frying and fry station operator error. In addition, the task of preparing the french fries has traditionally been one of the least liked jobs within a fast food establishment. This is primarily due to the need to frequently refill the frying baskets from the sacks of slacked french fries, and the heat associated with the frying job because of its proximity to the hot cooking oil. Hence, there is a continuing need for improved apparatus for deep frying french fries. Specifically, there is a need for an automated french fry cooking apparatus that eliminates some of the manual labor associated with the deep frying of french fries.

An automated, coin operated, french fry vending machine is disclosed in the U.S. Pat. No. 4,722,267 to Galockin et al. The french fry vending machine includes a plurality of frozen foodstuff holding compartments located in a refrigeration chamber. Each of the holding compartments receives and stores a different foodstuff. A metered, dispensing rotatable wheel is positioned below the outlet of each holding compartment to, upon actuation, dispense a metered quantity of frozen foodstuff to a conveyor. The conveyor carries the frozen foodstuff to a frying basket positioned above a deep frying tank containing hot cooking oil.

The frying basket is coupled to a drive mechanism which moves the frying basket downward into the frying tank to a cooking position for frying the metered quantity of foodstuff. After a cooking sequence of approximately one minute, the frying basket is raised out of the frying tank to allow the drainage of oil from the foodstuff. The frying basket is then moved to a raised position for dispensing the deep fried foodstuff from the basket through a funnel into a container. The customer then removes the container full of cooked foodstuff from the vending machine. The vending machine is designed to hold four different types of frozen foodstuff so that the customer can choose the one that appeals to him most. However, the vending machine can only prepare a single portion of deep fried foodstuff at a time.

It is evident that there is a continuing need for improved automated apparatus for deep frying frozen foodstuff. Specifically, there is a need for a cooking apparatus that can be used by fast food establishments. In addition, there is need for a cooking apparatus that can prepare both small and large numbers of portions of frozen foodstuff, thereby handling peek dinner periods as well as slow periods within a fast food establishment.

SUMMARY OF THE INVENTION

An automated french fry cooking apparatus for deep-frying french fries in fast food establishments includes a refrigeration unit which contains a supply of frozen french fries. Positioned adjacent to the refrigeration unit is a cooking unit which includes a frying tank having a supply of a hot cooking medium. A plurality of frying baskets are pivotally mounted to the cooking unit and each basket is movable between a loading position wherein the frying basket is oriented to receive frozen french fries from the refrigeration unit; a cooking position wherein the frying basket is immersed in the hot cooking medium within the frying tank to deep fry the french fries; a draining position for draining excess cooking medium from the now deep fried french fries; and a dump position wherein the now deep fried french fries are discharged from the frying basket. A delivery mechanism is mounted on the refrigeration unit and is alignable with any of the plurality of frying baskets so as to transfer frozen fries from the refrigeration unit to any one of the plurality of frying baskets oriented in its loading position.

The refrigeration unit includes a refrigerator having a first conveyor which supports the supply of frozen fries. Frozen french fries are loaded onto the first conveyor by a loading mechanism which includes a loading bin. The loading bin is movable in and out of the confines of the refrigerator by way of a lift mechanism. When the loading bin is withdrawn from the refrigerator, it can be rotated down by way of a link member to a position wherein it can be easily filled with fries by an employee of the fast food establishment. With the loading bin full, the loading bin is then rotated back to its original position within the confines of the refrigerator. With the loading bin inside the refrigerator, the loading bin can be rotated via an operating lever which dumps the frozen french fries out of the loading bin and onto the first conveyor.

The first conveyor can be driven to transfer the frozen fries to a second conveyor. The second conveyor is configured to weigh the frozen fries for portion control.

French fries are discharged from the second conveyor into the delivery mechanism. The delivery mechanism includes a shaft and a directional chute. The directional chute rotates and therefore can direct frozen french fries into any one of the loading position oriented frying baskets. Once a frying basket has received a quantity of frozen french fries, the frying basket is moved to its cooking position immersed in the hot cooking medium in the frying tank.

When the deep frying of french fries is complete, the frying basket is moved to the draining position, which has the same orientation as the loading position, to allow excess cooking medium to drain. After the deep fried fries have been sufficiently drained (i.e., for a specified but variable time) of excess cooking medium, the basket is then moved to the dump position wherein the now deep fried fries are discharged onto the conveyor unit of the discharge mechanism. The conveyor unit carries the deep fried fries to a holding bin where they are salted either automatically or manually and then bagged and distributed to customers as per their orders.

This french fry cooking apparatus is relatively uncomplicated and the automation of the process for deep frying the french fries eliminates the intensive manual labor associated with this process. Moreover, since the slacking time has been eliminated, the deep frying process starts with the fries always in the same state (i.e., frozen), so that the quality of the deep fried french fries is consistent and is automatically maintained giving the customer the same food product every time. In addition, this cooking apparatus is particularly useful in fast food establishments because of the plurality of frying baskets which enables the cooking apparatus to handle peek dinner periods as well as slow periods within the fast food establishment.

BRIEF DESCRIPTION OF THE DRAWINGS

FIG. 6 is a front elevational view of the delivery mechanism that forms part of the automated french fry cooking apparatus of the present invention.

FIG. 7 is a side elevational view of the delivery mechanism shown in FIG. 6.

FIG. 8 is an enlarged front elevational view of the cooking unit that forms part of the automated french fry cooking apparatus of the present invention.

FIG. 10 is a top elevational view of the loading mechanism that forms part of the automated french fry cooking apparatus of the present invention.

FIG. 11 is a side elevational view of the telescoping unit that forms part of the loading mechanism shown in FIG. 10.

FIG. 14 is a block diagram schematic view of a control system of the automated french fry cooking apparatus of the present invention.

DETAILED DESCRIPTION OF THE PREFERRED EMBODIMENTS

Figure 1:
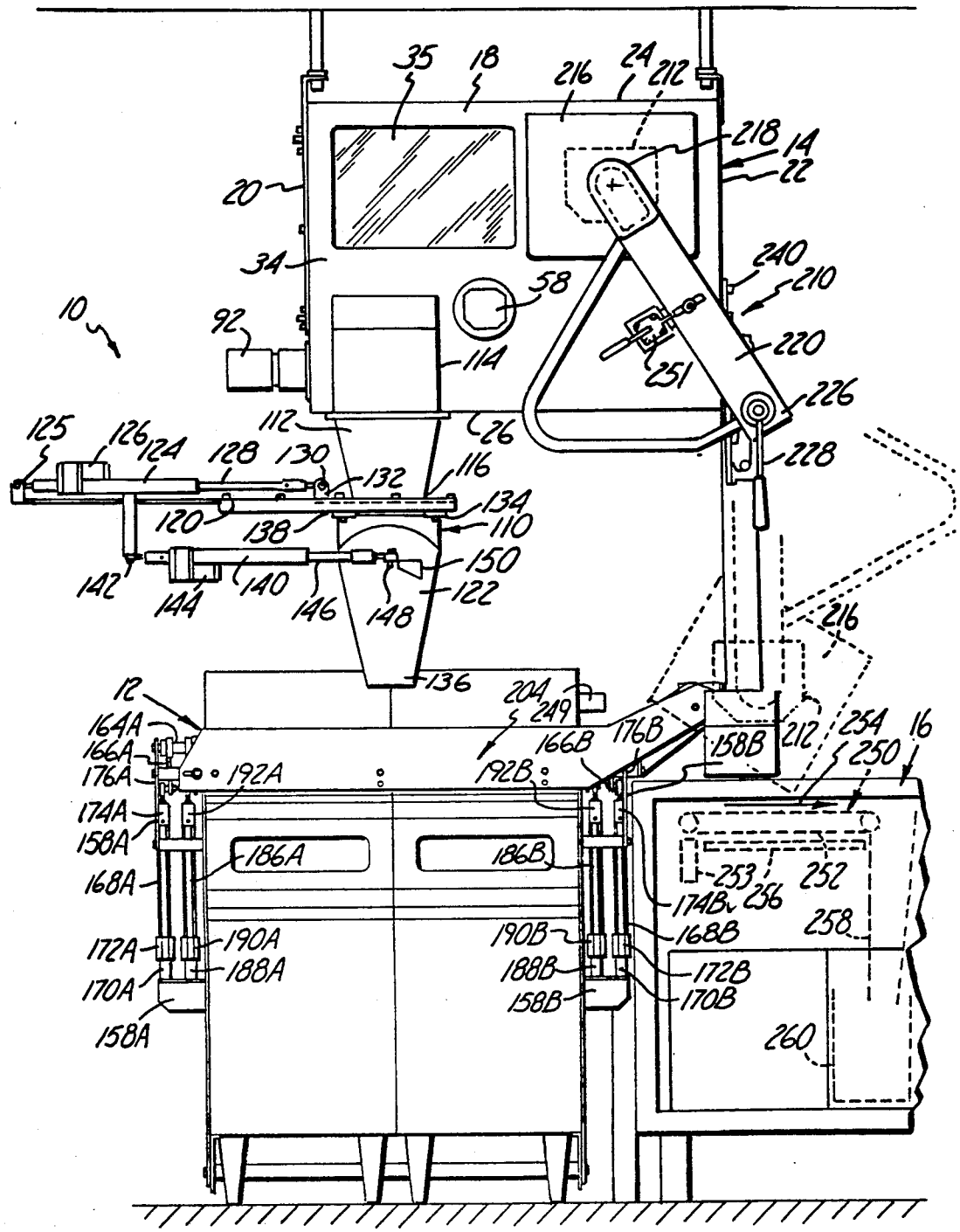
FIG. 1 is a front elevational view of an automated french fry cooking apparatus of the present invention.
Figure 2:
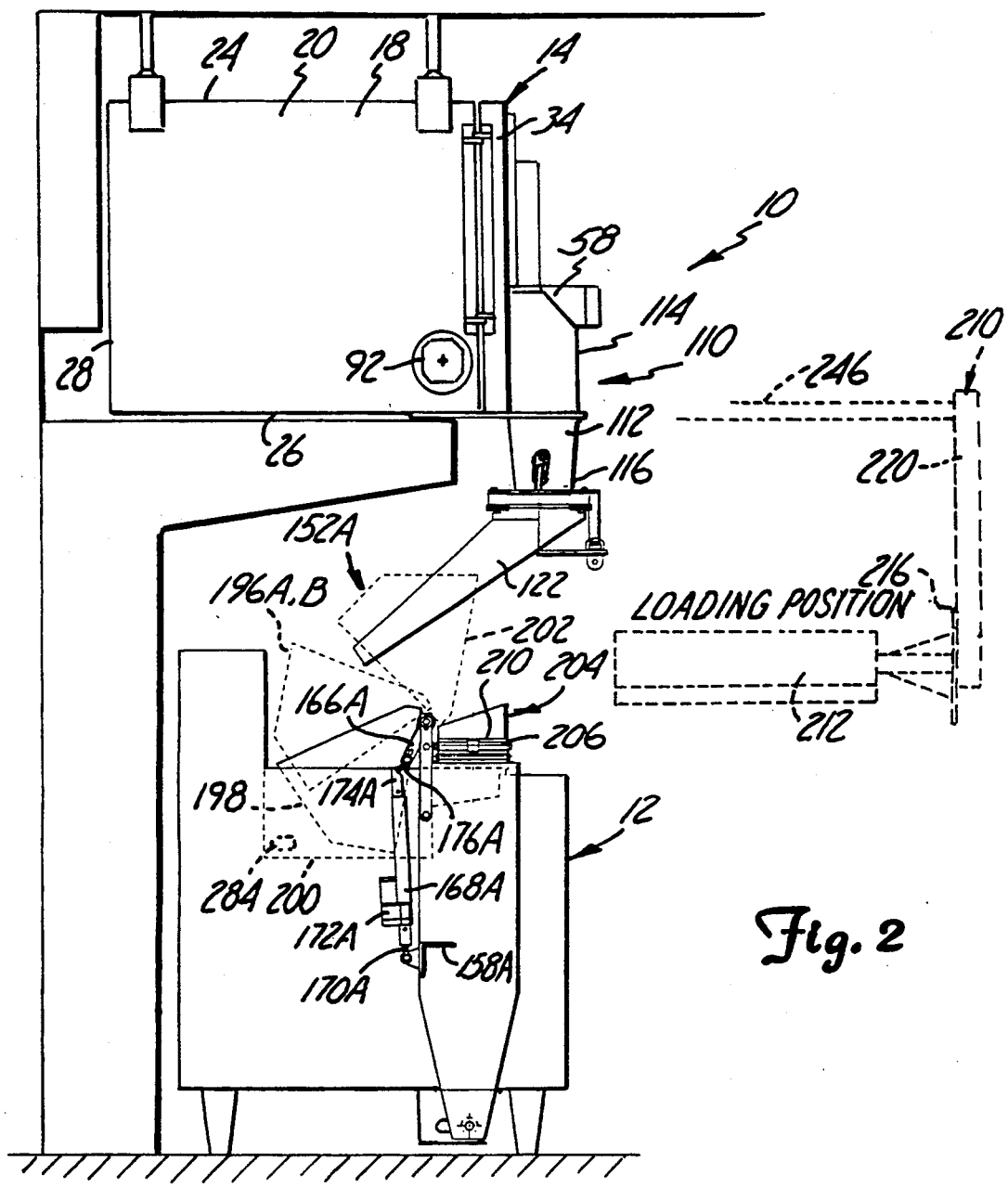
FIG. 2 is a side elevational view of the automated french fry cooking apparatus shown in FIG. 1.

An automated french fry cooking apparatus 10 in accordance with the present invention is illustrated generally in FIGS. 1 and 2. The cooking apparatus 10 which is designed for use in fast food establishments includes a cooking unit 12 for deep frying metered portions of frozen french fries. A refrigeration unit 14 is mounted above the cooking unit 12 and is configured to store a large quantity of frozen french fries for delivery to the cooking unit 12. A holding bin 16 positioned adjacent to the cooking unit 12 is configured to receive and hold deep fried french fries delivered from the cooking unit 12 to the holding bin 16. Deep fried french fries within the holding bin 16 are salted (either automatically or manually) and then bagged by an employee of the fast food establishment for distribution to the customers as per their orders.

Figure 3:
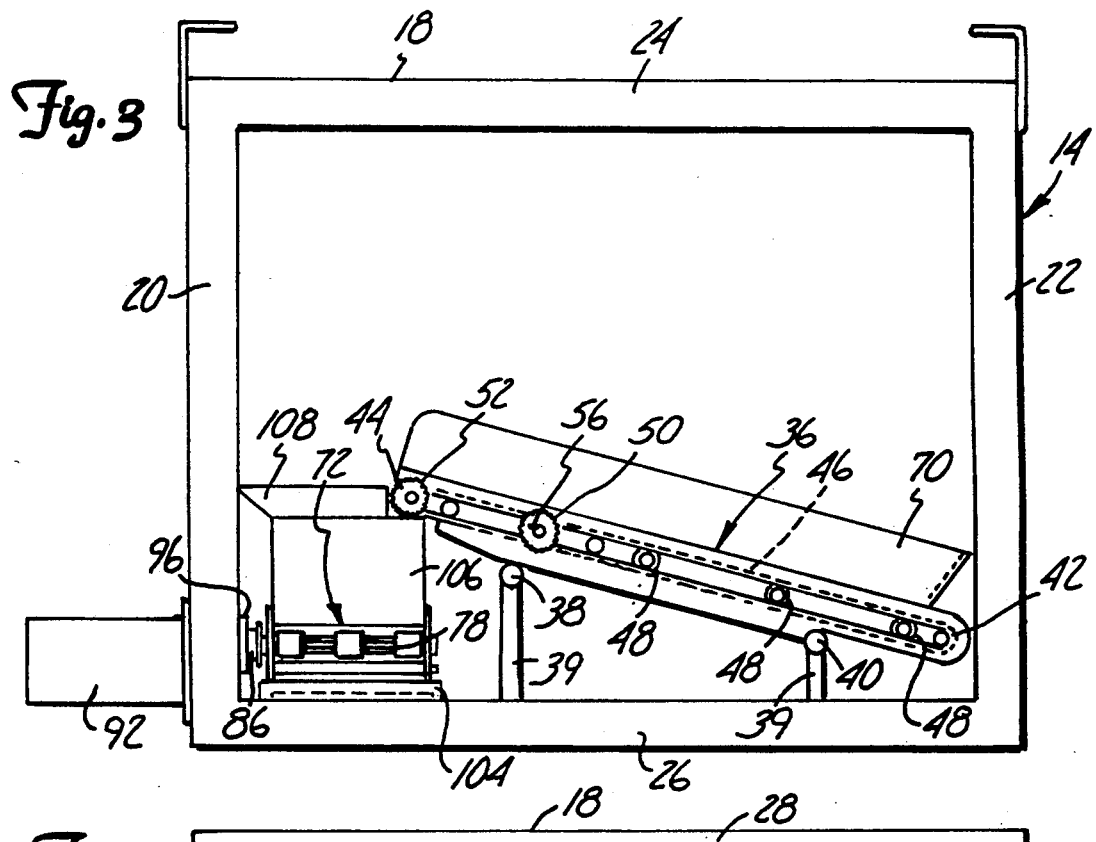
FIG. 3 is a front elevational view of the interior of the refrigerator that forms part of the automated french fry cooking apparatus of the present invention.
Figure 4:
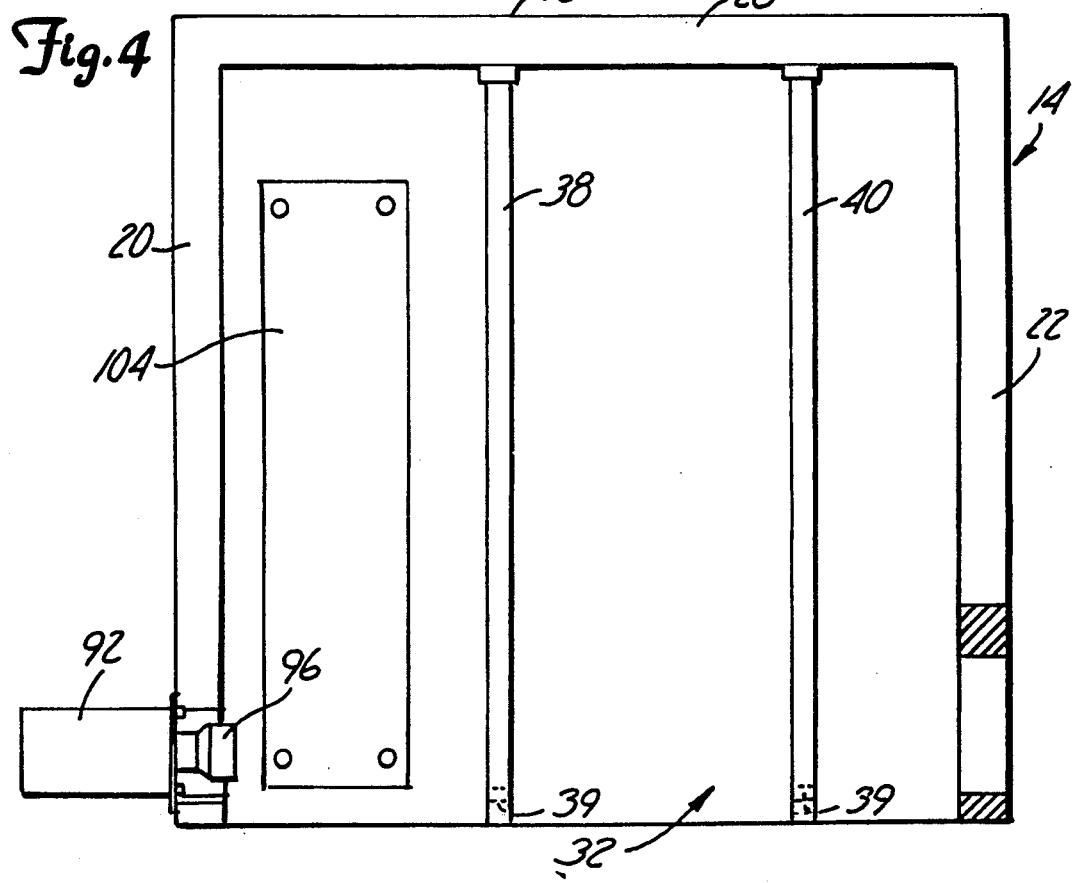
FIG. 4 is a top elevational view similar to FIG. 3 but with the conveyor units of the refrigerator unit removed therefrom.
Figure 5:
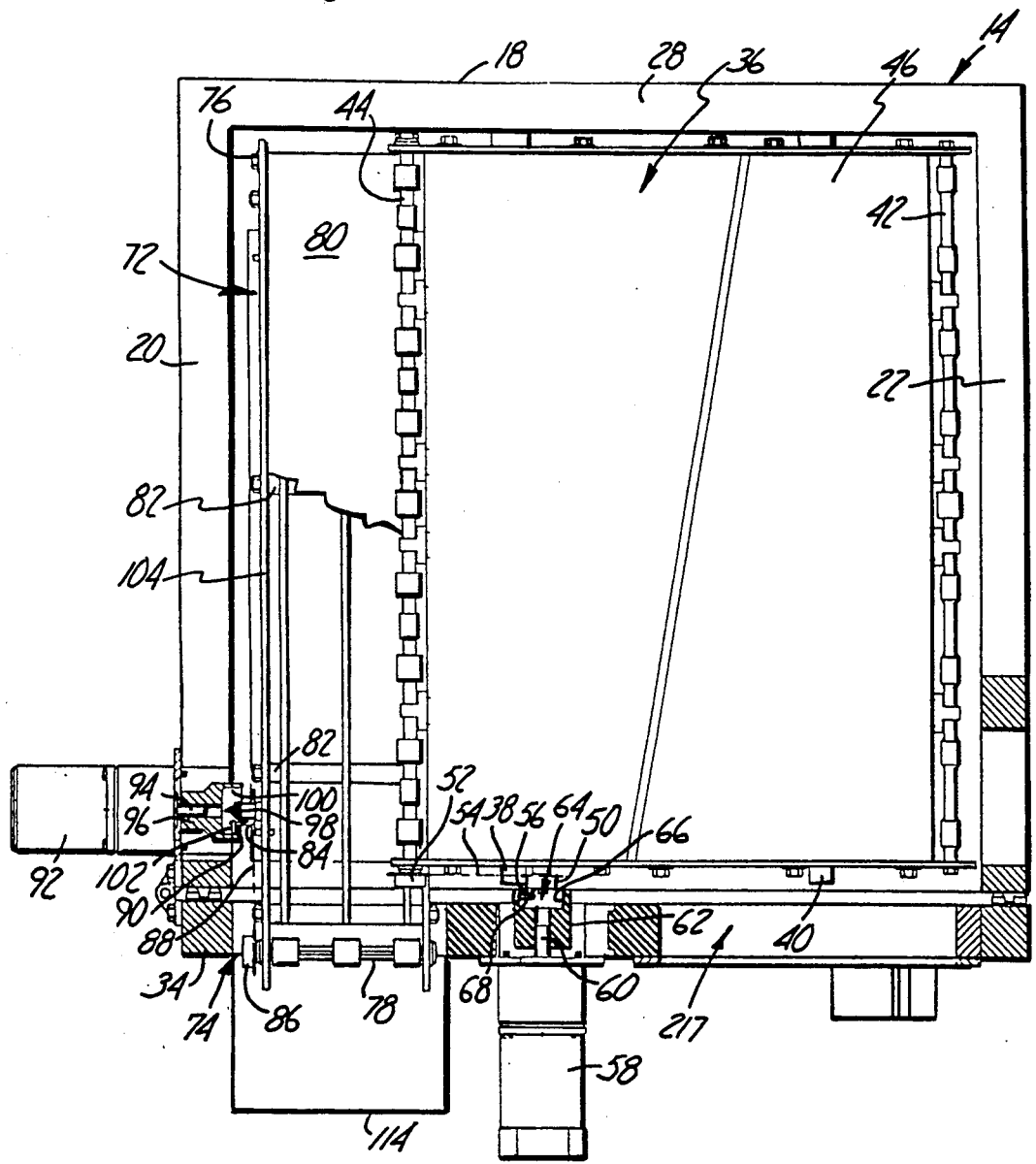
FIG. 5 a top elevational view partially in section of the interior of the refrigerator shown in FIG. 3.

The refrigeration unit 14 includes an insulated refrigerator 18 having first and second side walls 20 and 22, respectively, top and bottom walls 24 and 26, respectively, and a rear wall 28. As seen in FIGS. 3-5, a front opening 32 of the refrigerator can be closed by a pivotable door 34 having a window 35 for viewing the contents of the refrigerator 18. Mounted within the refrigerator 18 is a first conveyor 36 which is removably supported on first and second, spaced, support posts 38 and 40, respectively. First ends of the support posts 38 and 40 are mounted on the rear wall 28, while opposite, second ends of the support posts 38 and 40 are supported by brackets 39 that extend upwardly from the bottom wall of the refrigerator 18. As seen best in FIG. 3, the first support post 38 is elevated with respect to the second support post 40 such that the first conveyor 36 is mounted at an angle with respect to the bottom wall 26. The first conveyor 36 merely rests on the first and second support posts 38 and 40, such that the first conveyor 36 can be easily removed from the refrigerator 18 to allow the first conveyor 36 and interior of the refrigerator 18 to be cleaned.

The first conveyor 36 includes an idler spindle 42 at its proximal end and a driven spindle 44 at its distal end over which a continuous belt 46 extends. The continuous belt 46 supports the large quantity of frozen french fries within the refrigerator 18. A plurality of spaced rods 48 (only some of which are shown in FIG. 3) support the continuous belt 46 between the idler spindle 42 and the driven spindle 44. The longitudinal axes of the idler spindle 42, the rods 48 and the driven spindle 44 extend parallel to the first and second support posts 38 and 40, so that the french fry supporting surface of the continuous belt 46 moves from the second side wall 22 towards the first side wall 20.

As seen in FIGS. 3 and 5, the first conveyor includes a drive sprocket 50 coupled to a driven sprocket 52 of the drive spindle 44 by way of a continuous chain 54. The drive sprocket 50 includes an engagement pin 56 that extends outwardly from the drive sprocket 50 towards the door 34 of the refrigerator 18. A first electric drive motor 58 is mounted on the outside of the door 34 of the refrigerator 18. An output shaft 60 of the first drive motor 58 includes a drive hub 62 having a recessed portion 64. Fixed to a sidewall 66 of the recessed portion 64 is a drive rod 68. The drive rod 68 extends substantially perpendicular to the engagement pin 56 when the door 34 is in a closed position (see FIG. 5).

The first drive motor 58 is linked to the first conveyor 36 merely through an abutment type interaction between the drive rod 68 and the engagement pin 56 which act as a releasable coupler. When the door 34 is closed and upon actuation of the first drive motor 58, the drive rod 68 engages the engagement pin 56 which rotates the drive sprocket 50. Rotation of the drive sprocket 50 rotates the driven spindle 44 via the continuous chain 54 and thereby causes movement of the continuous belt 46. To decouple the first drive motor 58 from the first conveyor 36, the door 34 of the refrigerator 18 need only be opened which moves the drive rod 68 out of contact with the engagement pin 56.

As seen in FIGS. 3 and 5, the first conveyor 36 extends from the rear wall 28 to the door 34 and includes an angled wall 70 which extends about the proximal end and the two side ends of the first conveyor 36. The angled wall 70 confines the large quantity of frozen french fries to the french fry supporting surface of the first conveyor 36 and thereby facilitates the movement of the french fries along the first conveyor 36.

As seen in FIG. 5, the refrigerator 18 further includes a second conveyor 72 which extends from the rear wall 28 of the refrigerator 18 through an opening 74 in the door 34. The opening 74 in the door 34 is large enough such that the second conveyor 72 does not interfere with movement of the door 34 between open and closed positions. The second conveyor 72 is mounted within the refrigerator 18 below the distal end of the first conveyor 36 such that frozen french fries moved along the first conveyor 36 are delivered to the second conveyor 72 for transfer out of the refrigerator 18.

The second conveyor 72 includes an idler spindle 76 at its proximal end and a driven spindle 78 at its distal end over which a continuous belt 80 extends. A plurality of spaced rods 82 (only some of which are shown in FIG. 5) support the continuous belt 80 between the idler spindle 76 and driven spindle 78. The longitudinal axes of the idler spindle 76, the drive spindle 78 and the rods 82 extend perpendicular to the first and second support posts 38 and 40, so that the french fry supporting surface of the continuous belt 80 moves from the rear wall 28 through the opening 74 in the door 34.

The second conveyor 72 further includes a drive sprocket 84 coupled to a driven sprocket 86 of the driven spindle 78 by way of a continuous chain 88. The drive sprocket 84 includes an engagement pin 90 that extends outwardly from the drive sprocket 84 towards the first side wall 20 of the refrigerator 18. A second electric drive motor 92 is mounted on the outside of the first side wall 20 of the refrigerator 18. An output shaft 94 of the second drive motor 92 includes a drive hub 96 having a recessed portion 98. Fixed to a sidewall 100 of the recessed portion 98 is a drive rod 102. As seen in FIG. 5, the drive rod 102 extends substantially perpendicular to the engagement pin 90.

The drive rod 102 and engagement pin 90 cooperate to allow the second drive motor 92 to drive the second conveyor 72 in the same manner as described above in relation to the drive rod 68 and engagement pin 56 of the first drive motor 58 and first conveyor 36, respectively. The releasable coupler formed by the abutment type interaction between the drive rod 102 and the engagement pin 90 allows the second conveyor 72 to be easily removed from the refrigerator 18. Removal of the second conveyor 72 from the refrigerator 18 allows the second conveyor 72 and the refrigerator 18 to be cleaned.

As seen in FIGS. 3 and 4, the second conveyor 72 extends parallel to the bottom wall 26 of the refrigerator 18. A metering mechanism, such as a tare scale 104, is associated with one of the first and second conveyors 36 and 72, respectively. Preferably, the tare scale 104 is associated with the second conveyor 72. The second conveyor 72 is removably supported on the tare scale 104 mounted on the bottom wall 26. The tare scale 104 (which includes load cells) monitors the weight of the frozen french fries on the second conveyor 72. By monitoring the weight of the frozen french fries, the tare scale 104 can determine the amount of fries metered out of the refrigerator 18 by the second conveyor 72 for delivery to the cooking unit 12.

The second conveyor 72 further includes an upstanding wall 106 that extends about the proximal end and side edges of the second conveyor 72. The upstanding wall 106 confines the frozen french fries to the fry supporting surface of the second conveyor 72. An angled baffle 108 extends about the top edge of the upstanding wall 106 along the proximal end and along the side edge of the second conveyor 72 nearest the first side wall 20 of the refrigerator 18. The angled baffle 108 helps to direct frozen french fries falling off of the first conveyor 36 onto the second conveyor 72.

As seen in FIGS. 1, 6 and 7, frozen french fries coming off of the distal end of the second conveyor 72 are transferred to the cooking unit 12 by a delivery mechanism 110 that forms part of the refrigeration unit 14. The delivery mechanism 110 includes a vertical shaft 112 mounted to the bottom 26 of the refrigerator 18 by a plate 111. A proximal end 114 of the shaft 112 is in aligned registry with the opening 74 in the door 34. A distal end 116 of the shaft 112 is covered by a gate 118 (see FIG. 6) slidably mounted on a bracket 120. Beneath the gate 118 is a rotatable directional chute 122.

The gate 118 is movable relative to the bracket 120 between a closed position wherein frozen french fries coming off of the second conveyor 72 are held within the shaft 112, and an open position wherein the fries pass through the distal end 116 of the shaft 112 into the chute 122. The gate 118 is movable between open and closed positions by way of a drive cylinder 124 pivotally mounted at its proximal end 125 to the bracket 120. The drive cylinder 124 includes an electric motor 126 Which drives a screw-threaded rod 128 whose distal end 130 is pivotally secured to an extension 132 of the gate 118. Extension of the screw-threaded rod 128 relative to the drive cylinder 124 closes the gate 118, whereas, retraction of the screw-threaded rod 128 opens the gate 118.

The directional chute 122 includes a proximal end 134 in aligned registry with the distal end 116 of the shaft 112 and a distal end 136. The directional chute 122 is rotatably supported on the bracket 120 by four roller bearings 138 arranged concentrically about the proximal end 134 of the chute 122. The chute 122 is rotatable relative to the shaft 112 by way of a drive cylinder 140 pivotally mounted at its proximal end 142 to the bracket 120. The drive cylinder 140 includes an electric motor 144 which drives a screw-threaded rod 146 whose distal end 148 is pivotally secured to a rearward projection 150 of the chute 122. Extension and retraction of the screw-threaded rod 146 relative to the drive cylinder 140 moves the distal end 136 of the chute 122 in an arc and into alignment with any one of four frying baskets 152A, 152B, 154A and 154B of the cooking unit 12.

Figure 9:
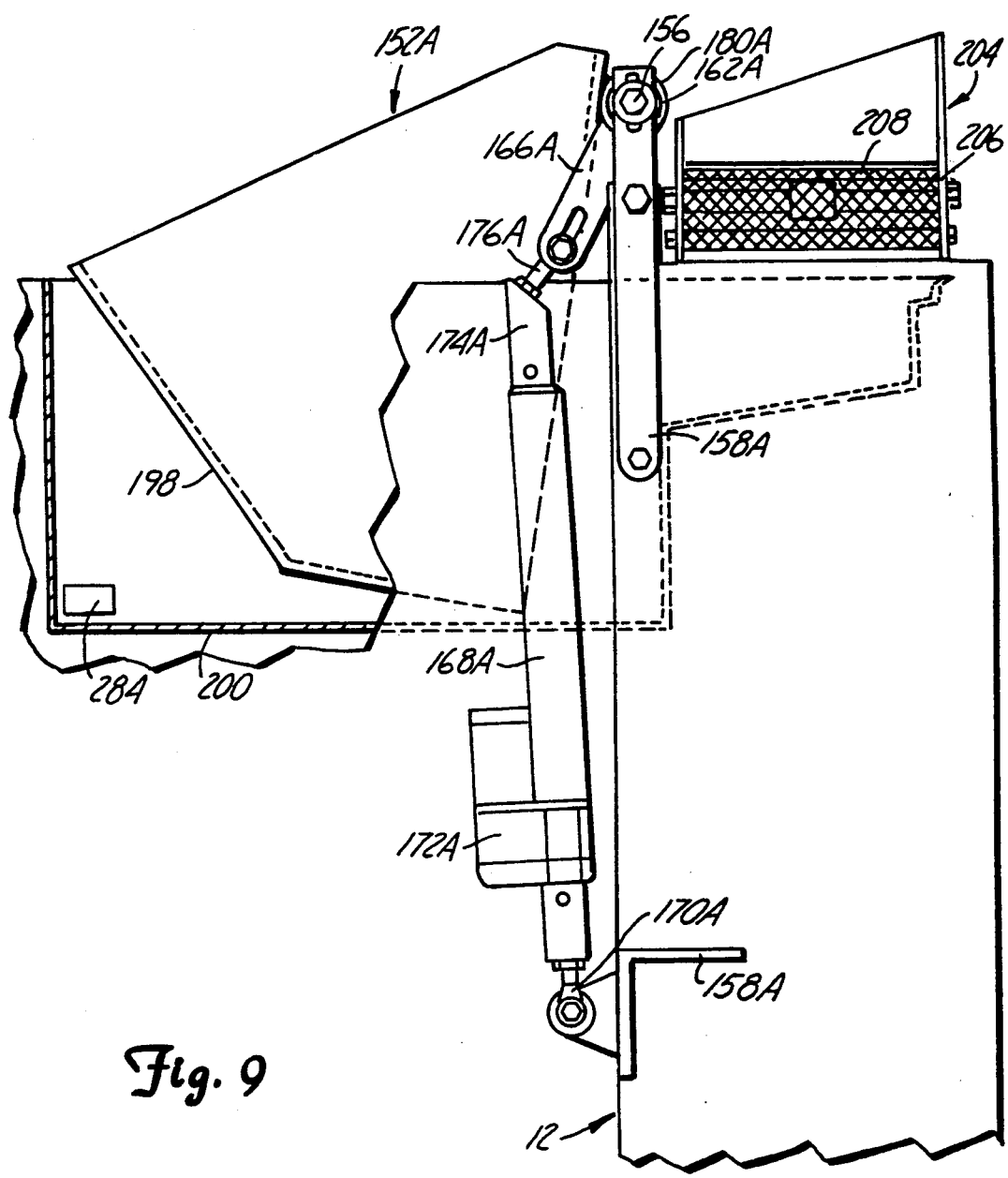
FIG. 9 is an enlarged side elevational view partially in section of the cooking unit shown in FIG. 8.

As seen in FIG. 8, frying baskets 152A and 152B are spaced furthest from one another, whereas frying baskets 154A and 154B are directly next to one another. As seen in FIGS. 8 and 9, a fixed support bar 156 is secured at its ends by first and second brackets 158A and 158B to the cooking unit 12. A median bracket 160 supports the support bar 156 at its intermediate region. The components and operation of the frying baskets 152A and 154A are mirror images of the frying baskets 152B and 154B, so the components and operation of only the frying baskets 152A and 154A will be described with the understanding that like numerals designate like parts.

As seen in FIG. 8, the frying basket 154A is mounted on a distal end 161A of an inner tube 162A that allows the frying basket 154A to rotate about the support bar 156. The proximal end 164A of the inner tube 162A includes a lever arm 166A. The combination of the inner tube 162A and frying basket 154A is rotatable relative to the shaft 156 by way of a drive cylinder 168A pivotally mounted at its proximal end 170A to the bracket 158A. The drive cylinder 168A includes an electric motor 172A which drives a screw-threaded rod 174A whose distal end 176A is pivotally secured to the lever arm 166A. Extension and retraction of the screw-threaded rod 174A relative to the drive cylinder 168A pivots the frying basket 154A about the support bar 156.

The frying basket 152A is mounted on a distal end 178A of an outer tube 180A that extends concentrically about and is rotatable relative to the inner tube 162A. A proximal end 182A of the outer tube 180A includes a lever arm 184A. The combination of the outer tube 180A and frying basket 152A is rotatable relative to the inner tube 162A by way of a drive cylinder 186A pivotally mounted at its proximal end 188A to the bracket 158A. The drive cylinder 186A includes an electric motor 190A which drives a screw-threaded rod 192A whose distal end 194A is pivotally secured to the lever arm 184A. Extension and retraction of the screw-threaded rod 192A relative to the drive cylinder 186A pivots the frying basket 152A about the inner tube 162A.

As seen in FIG. 2, each of the frying baskets 152A, 154A, 152B and 154B is pivotally movable between four positions: a loading position 196A wherein the frying basket 152A, 154A, 152B and 154B is oriented to receive frozen french fries discharged from the directional chute 122; a cooking position 198 wherein the fries within the frying basket 152A, 154A, 152B and 154B are immersed within a hot cooking medium, such as hot cooking oil contained within a frying tank 200 within the cooking unit 12; a draining position 196B which has the same orientation as the loading position 196A and wherein the frying basket 152A, 154A, 152B and 154B is positioned to allow excess hot cooking oil to be drained from the now deep fried french fries; and a dump position 202 wherein french fries that are now deep fried are discharged from the frying basket 152A, 154A, 152B and 154B onto a discharge mechanism 204 of the cooking unit 12. Any one of or combination of frying baskets 152A, 154A, 152B and 154B can be pivotally moved between the loading, cooking, draining and dump positions.

As seen in FIGS. 2 and 9, the discharge mechanism 204 mounted opposite the frying baskets 152A, 154A, 152B and 154B includes a conveyor unit 206 having a motor driven continuous belt member 208 which carries deep fried fries discharged from the baskets 152A, 154A, 152B and 154B to the holding bin 16. The holding bin 16 is used to merely store the hot french fries such that they can be manually salted and then loaded into fry bags by an employee of the fast food establishment for distribution to customers as per their orders. Alternatively, the hot french fries can be salted by an automatic salter 249 mounted adjacent to the conveyor unit 206 (see FIG. 1).

The holding bin 16 includes a live bottom 250 comprising a conveyor device 252 driven by a motor 253. The conveyor device 252 slowly moves in the direction of arrow 254. Mounted beneath the conveyor device 252 is a heating mechanism 256 which keeps deep fried french fries supported on the conveyor device 252 warm. At a discharge end of the conveyor device 252 is a chute 258 which carries french fries discharged from the conveyor device 252 to a waste container 260.

In operation, deep fried french fries are discharged from the conveyor unit 206 onto a receiving end of the conveyor device 252. The conveyor device 252 moves at a very slow pace, such that french fries at the receiving end of the conveyor device 252 take approximately seven minutes to reach the chute 258. While the french fries are on the conveyor device 252 they can be bagged for distribution to customers. Any french fries not bagged and served within seven minutes time from when they are discharged onto the receiving end of the conveyor device 252 are discharged into the chute 258 and therefrom into the waste container 260. Fries not served within the seven minute time frame exhibit a noticeable taste and quality difference as compared to fries just cooked.

Frozen french fries are loaded onto the first conveyor 36 by way of a loading mechanism 210 that forms part of the refrigeration unit 14. As seen in FIGS. 1 and 10, the loading mechanism 210 includes a loading bin 212 mounted on a shaft 214 rotatably supported by an auxiliary door 216 and a first end 218 of a link member 220. The shaft 214 includes a first sprocket 222 which is coupled by a continuous chain 223 to a second sprocket 224 rotatably mounted on an axle 225 at a second end 226 of the link member 220. The link 220 is rotatably mounted on the axle 225 so that the link 220 can be rotated relative to the axle 225. An operating lever 228 fixed to the second sprocket 224 can be rotated either clockwise or counterclockwise, which drives the chain 223 and thereby the first sprocket 222 to rotate the loading bin 212 and thereby dump the contents thereof (i.e., frozen french fries) onto the first conveyor 36.

The operating lever 228 and second sprocket 224 combination is biased by a spring 230 against movement along a longitudinal axis of the axle 225. The second sprocket 224 includes cutouts 232 that normally receive opposite ends of a lock pin 234 which extends through the axle 225 and which latches the second sprocket 224 against rotation about the axle 225. This latching mechanism prevents the loading bin 212 from rotating by itself because of weight differentials between one side of the loading bin 212 and its opposite side. To overcome this latching mechanism, enough rotational force needs to be applied to the operating lever 228 to overcome the force of the spring 230, which allows the second sprocket 224 to ride over the opposite ends of the pin 234.

Figures 12, 13:
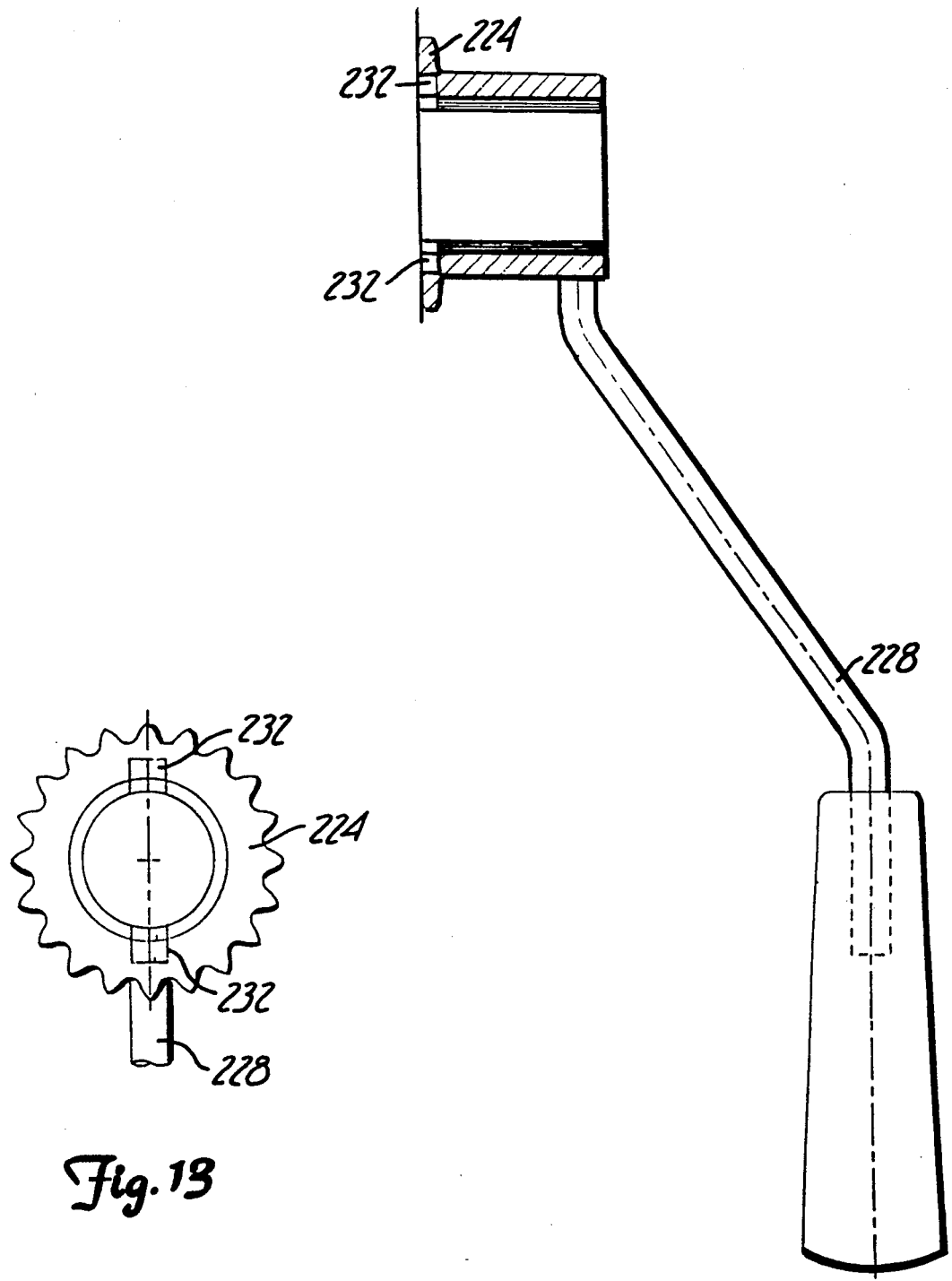
FIG. 12 is a side elevational view partially in section of the operating lever for the loading bin dump mechanism that forms part of the loading mechanism shown in FIG. 10.
FIG. 13 is a front elevational view of the sprocket head of the operating lever shown in FIG. 12.

As seen in FIGS. 10 and 13, the loading bin 212 is movable into and out of the confines of the refrigerator 18 through an opening 217 in the door 34 via a lift mechanism 236 coupling the link member 220 to the second side wall 22 of the refrigerator 18. The lift mechanism 236 includes a telescoping unit 238 mounted to the second side wall 22 of the refrigerator 18 by a mounting bracket 240. The telescoping unit 238 includes a pair of first telescoping rods 242 slidably mounted within a pair of support brackets 244 secured to the mounting bracket 240. A second telescoping rod 246 is slidably mounted relative to the pair of first telescoping rods 242 by a bracket 248. The second telescoping rod 246 is fixed to the axle 225 such that their longitudinal axes are aligned with one another.

The telescoping unit 238 allows the link member 220, loading bin 212 and auxiliary door 216 combination to move out away from the door 34 (through the opening 217) far enough such that the bin 212 is completely out of the refrigerator 18. Once the loading bin 212 has passed through the opening 217 in the door 34 and thereby out of the refrigerator 18, the link member 220 can be rotated counterclockwise (as viewed in FIG. 1) relative to the axle 225 so that the loading bin 212 is moved down to the level at which an employee of the fast food establishment can fill the loading bin 212 with frozen french fries. The loading bin 212 is designed to carry roughly twelve pounds of frozen french fries.

Once the loading bin 212 is full, the link member 220 is merely rotated clockwise relative to the axle 225 back up into position so that the bin 212 is aligned with the opening 217 in the door 34 of the refrigerator 18. The bin 212 is then inserted back into the refrigerator 18 by simply pushing on the link member 220 and collapsing the telescoping mechanism 236. A DE-STA-CO clamp 251 is used to hold the link member 220 and thereby the auxiliary door 216 and the bin 212 in position against the refrigerator 18.

As seen in FIG. 14, the automated french fry cooking apparatus 10 is coupled to a control system 262. The control system 262 includes a plurality of point of sale devices, such as cash registers 264, which are linked to a manager's node 266 via a communication line 263. The manager's node 266 includes a microprocessor 267 which receives information from the cash registers 264 regarding orders for items on the menu made by customers of the fast food establishment. The microprocessor 267 of the manager's node 266 is coupled to a plurality of CRT displays 268 via communication links 269. The CRT displays 268 are positioned about the restaurant so that they can be easily viewed by employees. The CRT displays 268 are used to exhibit order information which is used by the employees to determine the type and number of food items to be prepared.

Customers orders for french fries are relayed from the microprocessor 267 of the manager's node 266 to a control module 270 of the french fry cooking apparatus 10 through a communication channel, such as a serial link 271. The control module 270 includes a microprocessor 272 having a communications device 274, an I/O device 276, a motor control 278 and timers/counters mechanism 280.

The I/O device 276 is coupled to an input mechanism 282 through which information regarding operating parameters for the cooking apparatus can be feed into the microprocessor 272 of the control module 270. These operating parameters may include cooking times for the frozen french fries, draining times for allowing excess oil to drain from cooked french fries and portion sizes of frozen french fries metered out by the second conveyor 72. The portion sizes can be varied from just enough frozen fries to fill a single fry bag, to enough frozen fries to fully load a frying basket 152A, 154A, 152B and 154B which can hold enough fries to fill a great number of fry bags. The I/O device 276 is further coupled to the tare scale 104. The tare scale 104 delivers information to the I/O device 276 related to the weight of frozen fries and thereby the number of portions of fries supported on and capable of being metered out by the second conveyor 72. The motor control 278 is coupled to each of the motors 58, 92, 126, 144, 253, 172A, 172B, 190A and 190B of the cooking apparatus 10 and is configured to control the operation of these motors based upon information feed into the microprocessor 272 of the control module 270.

In practice, operating parameters for the cooking apparatus 10 are feed into the I/O device 276 via the input mechanism 282 which then relays the information to the motor control 278 and timers/counters mechanism 280 so as to initially set up the cooking apparatus is for operation. French fry orders taken at the cash registers 264 are fed into the communications device 274 of the control module 270 through the manager's node 266. This information along with information from the tare scale 104 is relayed through the I/O device 276 to the motor control 278 and the timers/counters mechanism 280 which initiates operation of the appropriate motors 58, 92, 126, 144, 253, 172A, 172B, 190A and 190B and the timers/counters of the timers/counters mechanism 280 that control the cooking apparatus 10. Information as to the status of the motors 58, 92, 126, 144, 253, 172A, 172B, 190A and 190B and the timers/counters (i.e., information as to the status of the deep frying procedure) is continuously relayed back to the communications device 274 via the timers/counters mechanism 280. This status information is then relayed to the microprocessor 267 of the manager's node 266 which displays the information on the CRT displays 268.

In operation, when orders for fries are received by the control module 270, the second conveyor 72 is actuated so that predetermined portion of frozen french fries fall into the shaft 112. The gate 118 is then opened and the directional chute 122 directs the frozen fries into one of the frying baskets 152A, 154A, 152B and 154B oriented in its loading position 196A. Once the frying basket 152A, 154A, 152B and 154B is filled with the frozen fries, the frying basket 152A, 154A, 152B and 154B is moved to the cooking position 198 immersed in the hot cooking oil.

When the french fries are completely deep fried, the frying basket 152A, 154A, 152B and 154B is moved from the cooking position 198 to the draining position 196B to allow excess cooking oil to drain from the now deep fried french fries. After the fries have been sufficiently drained of excess cooking oil, the frying basket 152A, 154A, 152B and 154B is moved to the dump position 202 wherein the now deep fried french fries are discharged from the frying basket 152A, 154A, 152B and 154B and onto the conveyor unit 206. The conveyor unit 206 takes the french fries to the holding bin 16. If the supply of frozen french fries on the second conveyor 72 needs to be replenished as dictated by the tare scale 104, the first conveyor 36 is actuated to deliver more frozen french fries to the second conveyor 72.

If the supply of frozen french fries on the first conveyor 36 needs to be replenished, the link member 220 is unlatched and moved away from the refrigerator 18 via the telescoping unit 236 such that the loading bin 212 is removed from the confines of the refrigerator 18 through the opening 217. The loading bin 212 is then moved down to worker level by way of the link member 220 rotating about the axle 225. An employee can then load further french fries into the loading bin 212, and rotate the bin 212 back up into the refrigerator 18. With the loading bin 212 within the refrigerator 18, the operating lever 228 is rotated, overcoming the bias of the spring 230 and french fries within the loading bin 212 are dumped onto the first conveyor 36.

The automated cooking apparatus 10 further embodies a new method of deep frying french fries. The frying basket 152A, 154A, 152B and 154B is first filled with unslacked frozen french fries at a temperature of approximately $-10°$ F to $0°$ F. The frying basket 152A, 154A, 152B and 154B is then immersed in hot cooking oil at a temperature of approximately $360°$ F. to $450°$ F. for a first period of time of approximately 60 to 120 seconds. The exact duration of the first period of time is dependent upon cooking oil temperature. Thermocouple mechanism 284 which is coupled to I/O device 276 of control module 270 measures the cooking oil temperature 30 seconds after the start of the cooking procedure. Based on the cooking oil temperature as measured by the thermocouple mechanism 284, the optimum duration of the first period of time is calculated by control module 270. The frying basket is then lifted out of the cooking oil and the french fries can remain in the frying basket for up to 20 minutes. When enough french fry orders are received the frying basket 152A, 154A, 152B and 154B is again immersed into the oil for a second period of time of approximately 30 to 90 seconds whereby the fries are deep fried to completion. Hence, the customer receives french fries that are hot right out of the cooking oil. Of course, if there is immediate need for a serving of french fries as determined by the control system 262, the frying basket remains in the cooking oil for the completion of the cooking process.

This french fry cooking apparatus 10 is relatively uncomplicated and the automation of the process for deep frying the french fries eliminates the intensive manual labor associated with this process. Moreover, since the slacking time has been eliminated, the deep frying process starts with the fries always in the same state (i.e., frozen), so that the quality of the deep fried french fries is consistent and is automatically maintained giving the customer the same food product every time. In addition, this cooking apparatus is particularly useful in fast food establishments because of the plurality of frying baskets which enables the cooking apparatus to handle peek dinner periods as well as slow periods within the fast food establishment.

Although the present invention has been described with reference to preferred embodiments, workers skilled in the art will recognize that changes may be made in form and detail without departing from the spirit and scope of the invention.

What is claimed is:

1. A cooking apparatus for deep frying foodstuff in a cooking medium comprising:
   a refrigeration system, including:
      a refrigeration unit;
      means within the refrigeration unit for supporting a supply of frozen foodstuff;
      receiving means positioned within the refrigeration unit and adjacent to the supporting means, the receiving means being configured to receive frozen foodstuff from the supporting means; and
      a metering mechanism positioned within the refrigeration unit, the metering mechanism being configured to monitor the weight of frozen foodstuff on the receiving means and thereby measure a metered quantity of frozen foodstuff;
   a cooking unit positioned adjacent to the refrigeration unit, including:
      a frying tank for containing a supply of a hot cooking medium; and
      a plurality of frying baskets associated with the cooking unit, each frying basket being movable between a loading position wherein the frying basket is oriented to receive frozen foodstuff from the refrigeration unit, a cooking position wherein the frying basket is immersed in the hot cooking medium within the frying tank for the deep frying of foodstuff, a draining position wherein excess cooking medium is allow to drain from the deep fried foodstuff and a dump position wherein deep fried foodstuff is discharged from the frying basket; and
   a delivery mechanism coupled to the refrigeration unit and alignable with any of the plurality of frying baskets for transferring a metered quantity of frozen foodstuff from the receiving means to any one of the plurality of frying baskets which is oriented in the loading position.

2. The cooking apparatus of claim 1, and further including:
   a holding bin positioned adjacent to the cooking unit; and
   a discharge mechanism coupled to the cooking unit for transferring deep fried foodstuff discharged from the frying baskets to the holding bin.

3. The cooking apparatus of claim 2 wherein the discharge mechanism includes a conveyor unit having a continuous belt member for carrying the deep fried foodstuff away from the cooking unit to the holding bin.

4. The cooking apparatus of claim 1 wherein the cooking unit further includes:
   a support bar for rotatably supporting the each one of the plurality of frying baskets for pivotable movement between the loading position, the cooking position, the draining position and the dump position.

5. The cooking apparatus of claim 4 wherein the cooking unit further includes:
   a drive mechanism mounted on the cooking unit and coupled to the plurality of frying baskets for pivotally moving any one of or combination of the plurality of frying baskets between the loading, cooking, draining and dump positions.

6. The cooking apparatus of claim 5 wherein the drive mechanism includes a separate drive unit for each one of the plurality of frying baskets for moving the frying baskets between the loading, cooking, draining and dump positions.

7. The cooking apparatus of claim 1 wherein:
   the supporting means is a first conveyor member removably mounted within the refrigeration unit and configured to support the supply of frozen foodstuff; and the receiving means is a second conveyor member removably mounted within the refrigeration unit and positioned adjacent to a discharge end of the first conveyor member, the second conveyor member being configured to receive frozen foodstuff from the first conveyor member and transfer the frozen foodstuff to the delivery mechanism.

8. The cooking apparatus of claim 7 wherein the metering mechanism includes:

a tare scale mounted within the refrigeration unit and supporting the second conveyor member.

9. The cooking apparatus of claim 7 wherein the delivery mechanism includes:

a shaft mounted on the refrigeration unit and having a proximal end in aligned registry with a discharge end of the second conveyor and a distal end; and a directional chute movably mounted with respect to the shaft and having a proximal end in aligned registry with the distal end of the shaft and a distal end, the distal end of the chute being alignable with any one of the plurality of frying baskets for the transfer of frozen foodstuff thereto.

10. The cooking apparatus of claim 9 wherein the delivery mechanism further includes:

a slidable gate oriented between the distal end of the shaft and a proximal end of the chute and being slidably movable between a closed position wherein frozen foodstuff from the refrigeration unit are held within the shaft, and an open position wherein the frozen foodstuff passes through the distal end of the shaft, through the chute and into one of the plurality of frying baskets in alignment with the distal end of the chute.

11. The cooking apparatus of claim 9 wherein the directional chute is rotatably mounted at the distal end of the shaft and is movable within an arc for alignment of the distal end of the chute with any one of the plurality of frying baskets for the transfer of frozen foodstuff thereto.

12. The cooking apparatus of claim 7, and further including:

a loading mechanism mounted on the refrigeration unit for loading frozen foodstuff onto the first conveyor member within the refrigeration unit.

13. The cooking apparatus of claim the loading mechanism includes:

a loading bin; and a lift mechanism for coupling the loading bin to the refrigeration unit, the lift mechanism permitting movement of the loading bin between a first position wherein the loading bin is spaced from the refrigeration unit and the loading bin can be filled with frozen foodstuff, a second position wherein the loading bin is within the refrigeration unit and the loading bin remains filled with frozen foodstuff, and a third position wherein the loading bin discharges the frozen foodstuff to the first conveyor member.

14. The cooking apparatus of claim 13 wherein the lifting mechanism includes:

a link member having a first end and a second end;

a pivot member for pivotally mounting the loading bin to the second end of the link member;

an operator coupled to the loading bin for controlling movement of the loading bin between the second and third positions; and a telescoping device coupling the first end of the link to the refrigeration unit for permitting longitudinal movement of the loading bin between the first and second positions.

15. The cooking apparatus of claim 1 wherein the frozen foodstuff is frozen french fries.

16. The cooking apparatus of claim 2 wherein the holding bin includes:

a conveyor device having a receiving end and a discharge end, the conveyor device being configured to receive deep fried foodstuff from the discharge mechanism and move the deep fried foodstuff from the receiving end to the discharge end within a period of time in which the deep fried foodstuff exhibits a noticeable quality difference, and a waste container positioned beneath the discharge end for receiving the deep fried foodstuff exhibiting a noticeable quality difference from the conveyor device.

* * * * *

UNITED STATES PATENT AND TRADEMARK OFFICE
CERTIFICATE OF CORRECTION

PATENT NO. : 5,189,944

DATED : March 2, 1993

INVENTOR(S) : GLENN O. RASMUSSEN, James W. Finkowski, Robert F. Meyer Richard L. Keller, Thomas p. Kempf, Ronald N. Phillips It is certified that error appears in the above-identified patent and that said Letters Patent is hereby corrected as shown below:

Col. 14, line 4, delete "claim", insert --claim 12 wherein--

Signed and Sealed this

Sixteenth Day of November, 1993

Attest:

BRUCE LEHMAN

*Attesting Officer*  *Commissioner of Patents and Trademarks*